United States Patent
Barcat

(10) Patent No.: US 7,597,357 B2
(45) Date of Patent: Oct. 6, 2009

(54) MOTORIZED STEERING COLUMN MODULE WITH POSITION CONTROL

(75) Inventor: Florian Barcat, Tours (FR)

(73) Assignee: ZF Systemes de Direction NACAM, S.A.S. (FR)

( * ) Notice: Subject to any disclaimer, the term of this patent is extended or adjusted under 35 U.S.C. 154(b) by 421 days.

(21) Appl. No.: 11/221,033

(22) Filed: Sep. 7, 2005

(65) Prior Publication Data

US 2007/0176405 A1 Aug. 2, 2007

(30) Foreign Application Priority Data

Sep. 8, 2004 (FR) .................................. 04 09517

(51) Int. Cl.
*B62D 1/018* (2006.01)

(52) U.S. Cl. ................ 280/775; 74/495; 318/163

(58) Field of Classification Search ................ 280/775; 74/493–500; 318/162–164
See application file for complete search history.

(56) References Cited

U.S. PATENT DOCUMENTS

| | | | | |
|---|---|---|---|---|
| 4,204,255 A | * | 5/1980 | Cremer | 701/49 |
| 4,503,504 A | * | 3/1985 | Suzumura et al. | 701/49 |
| 4,752,085 A | * | 6/1988 | Yamamoto | 280/775 |
| 4,785,684 A | * | 11/1988 | Nishikawa et al. | 74/493 |
| 4,796,481 A | * | 1/1989 | Nolte | 74/493 |
| 4,814,675 A | * | 3/1989 | Perilhon | 318/400.22 |
| 4,900,059 A | * | 2/1990 | Kinoshita et al. | 280/775 |
| 5,178,411 A | * | 1/1993 | Fevre et al. | 280/775 |
| 5,275,066 A | * | 1/1994 | Hancock | 74/493 |
| 5,351,572 A | * | 10/1994 | Vortmeyer | 74/493 |
| 5,419,215 A | * | 5/1995 | Herron et al. | 74/493 |
| 6,195,601 B1 | * | 2/2001 | Spillner et al. | 701/41 |
| 6,711,965 B2 | * | 3/2004 | Tomaru et al. | 74/493 |
| 6,889,578 B2 | * | 5/2005 | Spaziani et al. | 74/661 |
| 2004/0023746 A1 | * | 2/2004 | Arihara | 475/280 |
| 2005/0275206 A1 | * | 12/2005 | Gerlind | 280/775 |
| 2006/0185462 A1 | * | 8/2006 | Berg et al. | 74/493 |

FOREIGN PATENT DOCUMENTS

| | | |
|---|---|---|
| DE | 42 17 664 A1 | 12/1992 |
| DE | 196 41 152 A1 | 4/1998 |
| EP | 0 213 482 A2 | 3/1987 |
| FR | 2 662 986 A1 | 12/1991 |

* cited by examiner

*Primary Examiner*—Paul N. Dickson
*Assistant Examiner*—Timothy Wilhelm
(74) *Attorney, Agent, or Firm*—DLA Piper LLP (US)

(57) ABSTRACT

A motorized steering column module with position control including a moving device that moves a steering wheel in an axial direction, bringing it closer or further away from a selected position, and in a radial plane for regulating upward and downward movement with the aid of at least one electronic motor controller; and a controller that varies the speed of the motor at least proximate a departure position and an arrival position.

20 Claims, 1 Drawing Sheet

MOTORIZED STEERING COLUMN MODULE WITH POSITION CONTROL

RELATED APPLICATION

This application claims priority of French Patent Application No. 04/09517, filed Sep. 8, 2004, hereby incorporated by reference.

FIELD OF THE INVENTION

This invention relates to a motorized steering column module.

BACKGROUND

Motorized steering column modules are known in the art that comprise one or two motors for ensuring the movement in the two control directions. In the solutions with a single motor one or several electromagnetic clutches permit the driving mechanism to be coupled in accordance with the different control modes.

Such modules permit the position of the steering wheel to be adjusted as a function of the shape and the preferences of the driver by movement in the axial and radial directions.

Movement in the axial direction allows the steering wheel to be brought closer to or further away from the driver. Radial movement is realized by tilting a part of the column along a pivoting axis perpendicular to the steering column. This allows the steering wheel to be raised or lowered.

In the solution implementing two motors each one corresponds to one of the control directions.

These motors can be constituted of rotary or linear, electric, hydraulic or pneumatic actuators. They are controlled by an electronic controller that receives instructions from contactors that allow the driver to control the different movements. The controller also receives, or receives as an alternative, instructions coming from a central controller of the vehicle for recording reference positions.

It also receives movement instructions for moving the steering wheel into a position called "easy entry", that frees to the maximum the access to the driver's seat at each entry into and exit out of the vehicle.

DE 196 41 152 and DE 42 17 664 describe examples of known modules. The motors described are direct-current motors piloted by a control of the electromechanical relay type, static relay type or power electronic components controlled by switching. The motors are supplied with their nominal voltage for starting and during the control and are put in short-circuit for braking and stopping.

The problem posed is that transitory noises are produced during starting or stopping of the movement due to the resumption of plays, rapid deformations of the mechanical components of the control system of the steering column and the elevated torque of the motor during starting. These noises are transmitted to the passenger compartment by the steering column by its very rigid definition and are therefore very difficult to filter.

SUMMARY OF THE INVENTION

This invention relates to a motorized steering column module with position control including a moving device that moves a steering wheel in an axial direction, bringing it closer or further away from a selected position, and in a radial plane for regulating upward and downward movement with the aid of at least one electronic motor controller, and a controller that varies the speed of the motor at least proximate a departure position and an arrival position.

BRIEF DESCRIPTION OF THE DRAWINGS

The invention will be better understood from a reading of the following description that refers to the attached drawings in which.

DETAILED DESCRIPTION

This invention provides an improved module characterized by improved control of the control motor or motors. To this end, the invention concerns in its most general meaning a motorized steering column module with position control comprising means for moving/shifting the steering wheel in an axial direction, bringing it closer or further away, and in a radial plane for regulating the position up and down with the aid of at least one electric motor control by an electronic means, and means for controlling a variation of the speed of this motor at least in the vicinity of the departure position and the arrival position.

This invention also increases the sensation of comfort when controlling the position of the steering wheel by a variation of the control speed. The sensation of robustness is also increased by a greater insensitivity to the variations of the supply voltage.

The controller is preferably programmed to control an acceleration of the movement during the motor startup and/or to control a deceleration of the movement during the approaching of the arrival position.

According to one aspect, the controller is programmed to ensure a compensation of the voltage variations of the motor supply.

The controller is preferably programmed to control a movement speed lower than the maximum speed upon approaching the position at the end of travel.

The motor is advantageously coupled to a sensor that delivers a signal that is a function of the real motor speed, which signal is transmitted to this controller.

According to another aspect, the controller controls the reduction of the movement speed upon approaching the end of travel.

According to yet another aspect, the controller controls a mode of reduced-speed movement when it receives particular control instructions.

The controller advantageously generates motor control/command signals in the form of constant tension scrambled at a variable cyclic ratio.

The parts activated by the motor preferably comprise at least one position reference sensor.

The invention is described below with reference made to a steering column control module comprising a first direct-current motor for adjusting the axial position of the steering wheel and comprising a second direct-current motor for adjusting the height of the steering wheel by tilting a section of the steering column relative to a transversal axis. The control mechanism will not be described in detail because it is known and because the invention applies to all types of such mechanisms. In particular, the invention is also applicable to mechanisms comprising a single motor and one or several clutches or linear, hydraulic or pneumatic motors. The motors can also be constituted by step-by-step/stepping motors controlled by a variable-frequency clock.

Figure 1:
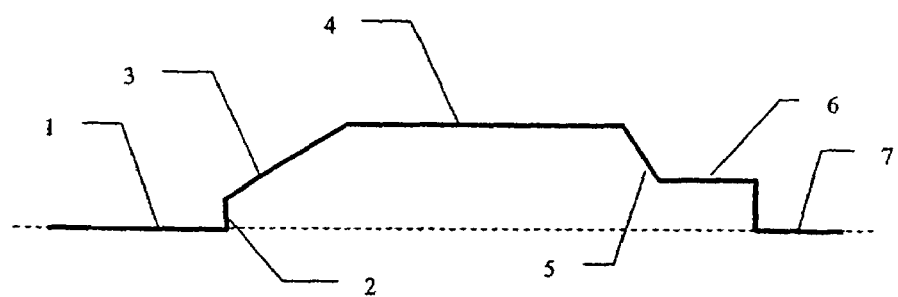
FIG. 1 represents an example of a curve of the variation of the motor speed.

In one example described in a non-limiting manner, each of the motors is piloted by a power electronic circuit controlled by a controller generating a modulated signal and with variable cyclic ratio (PWM (pulse width modulation) or MLI (modulation of impulse width) that permits the voltage to be controlled at the motor terminals from 0% to 100%. FIG. 1 shows an example of a variation of the motor speed during an activation cycle, then of the stopping of the movement.

At rest, the supply voltage of the motor is zero (range (1)). During the starting of the motor the supply is made with a minimum cyclic ratio (2) resulting in a non-zero minimal speed. The cyclic ratio then increases (3) progressively, e.g., in accordance with a linear law until the cyclic ratio achieves a maximal value corresponding, e.g., to the nominal or maximal speed. The speed is then maintained constant (4) until the stop command. This stop command can come from a position sensor, a manual command or an instruction calculated as a function of the prerecorded position sought. The speed then decreases (5), e.g., according to a linear law until reaching a slower control speed (6). Then, the motor supply is again reduced to a zero voltage (7).

Such a function having a succession of increasing, constant and decreasing slopes is not limiting. A function of the "Gaussian" type, e.g., can be envisioned.

Figure 2:
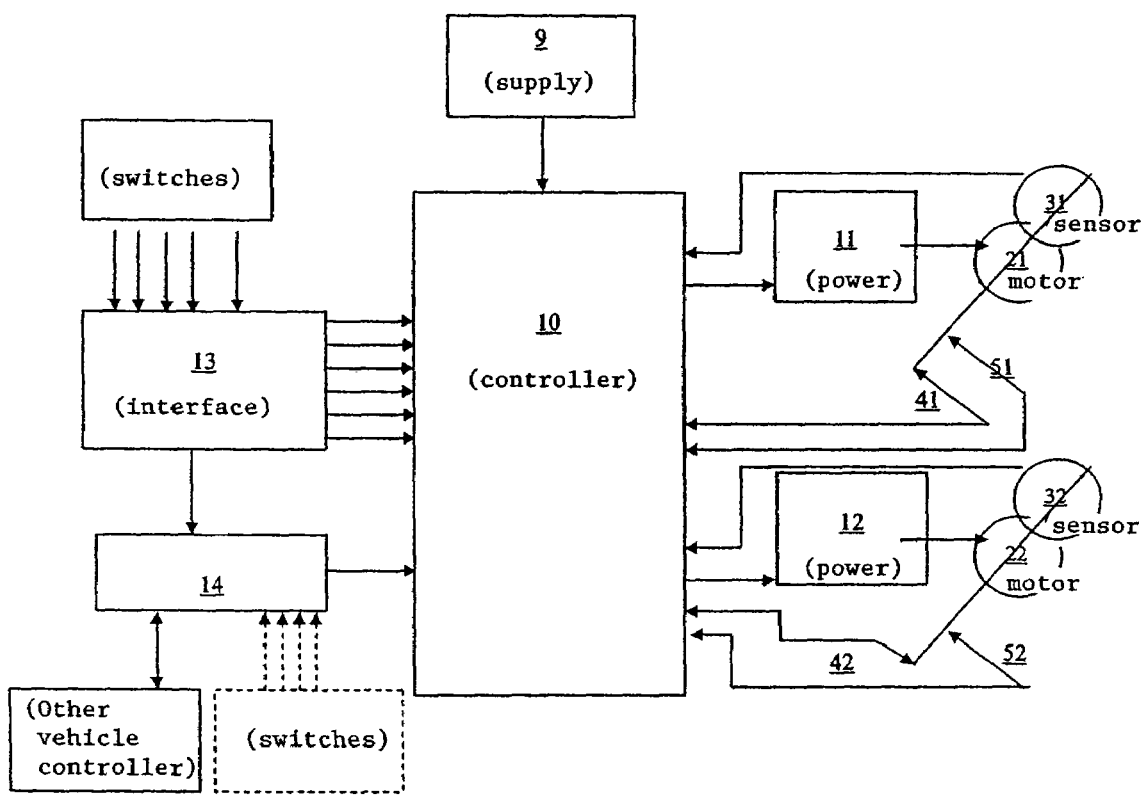
FIG. 2 represents a schematic view of the control circuits of a module in accordance with the invention.

FIG. 2 represents a schematic diagram of a control circuit for a module in conformity with the invention.

It comprises in a customary manner a supply 9 and a controller 10 as well as power circuits 11, 12 respectively controlling motors 21, 22. Motors 21, 22 are respectively coupled to position/speed sensors 31, 32. The parts driven by motors 21, 22 are otherwise equipped with one or two position reference sensors 41, 51; 42, 52).

Controller 10 receives instructions from shaping circuitry 13 primarily realizing the adaptation of impedance (or of the leveling of voltage or current) of the signals coming from the switches "rise, descent", and "return, exit", also "facilitated exit" or "go into a given memorized position". The controller also receives instructions coming from another controller of the vehicle or from other switches. These instructions are received in cabled/hard-wired form or multiplexed via the intermediation of messages on a communication bus. In the case of instructions received in cabled form, this module 14 is a shaping circuitry 13 primarily realizing the adaptation of impedance (or of the leveling of voltage or current) of signals permitting the recording of predefined positions, e.g., the preferred positions of different drivers of the vehicle. These positions are recorded in memory in a known manner and called from a command not represented in this scheme. In the case of instructions received in multiplexed form via the intermediation of messages on a communication bus, this module 14 is a controller/transceiver bus circuit. The totality of the messages is not defined here, but it contains the commands "rise, descent" and "return, exit", also "facilitated exit" or "go into a given memorized position" or "recording of predefined positions" and return messages about the state of the controller and the command in progress.

The controller also receives at its input the real voltage of supply battery 9 as well as position signals coming from sensors 31, 41, 51; 32, 42, 52).

The controller calculates control/command signals of power circuits 11, 12 by determining the cyclic ratio in real time as a function of the state of the different inputs.

Regulation of the speed maintains the speed instruction of the column what ever the supply voltage furnished by the battery is: the cyclic ratio develops inversely proportionately to the supply voltage to compensate variations in voltage.

In a particular aspect, the control to a memorized position is made at 100% of cyclic ratio and every control by transitory actions on the control buttons is made at a reduced speed.

The invention claimed is:

1. A motorized steering column module with position control comprising:
    at least one motor,
    a moving device driven by the at least one motor for moving a steering wheel associated to the steering column module in an axial direction, bringing it closer or further away from a selected position, and in a radial plane for regulating upward and downward movement of the steering wheel,
    an electronic motor controller for controlling the at least one motor, wherein the controller varies the speed of the motor at least proximate a departure position and an arrival position and wherein the controller is programmed to control acceleration of the movement during motor startup so that the speed of the motor continuously increases proximate the departure position.

2. The steering column module according to claim 1, wherein the controller is programmed to control deceleration of the movement approaching an arrival position.

3. The steering column module according to claim 1, wherein the controller is programmed to compensate for variations in voltage of a power supply for the controller at the level of the motor.

4. The steering column module according to claim 1, wherein the controller is programmed to control movement speed lower than a maximum speed upon approaching a position at the end of travel.

5. The steering column module according to claim 1, wherein the motor is coupled to a sensor that delivers a signal that is a function of real motor speed, which signal is transmitted to the controller.

6. The steering column module according to claim 1, wherein the controller controls reduction of movement speed upon approaching the end of travel.

7. The steering column module according to claim 1, wherein the controller controls a mode of reduced-speed movement when it receives particular control instructions.

8. The steering column module according to claim 1, wherein the controller generates motor control/command signals in the form of constant tension scrambled at a variable cyclic ratio.

9. The steering column module according to claim 1, wherein the controller controls the variable speed of the motor by a closed-loop regulation.

10. The steering column module according to claim 1, wherein parts activated by the motor comprise at least one position reference sensor.

11. A motorized steering column module with position control comprising:
    at least one motor,
    a moving device driven by the at least one motor for moving a steering wheel associated to the steering column module in an axial direction, bringing it closer or further away from a selected position, and in a radial plane for regulating upward and downward movement of the steering wheel,
    an electronic motor controller for controlling the at least one motor, wherein the controller varies the speed of the motor at least proximate a departure position and an arrival position and wherein the controller is programmed to control acceleration of the movement during motor startup so that the speed of the motor increases linearly or according to Gaussian law proximate the departure position.

12. The steering column module according to claim 11, wherein the controller is programmed to control deceleration of the movement approaching an arrival position.

13. The steering column module according to claim 11, wherein the controller is programmed to compensate for variations in voltage of a power supply for the controller at the level of the motor.

14. The steering column module according to claim 11, wherein the controller is programmed to control movement speed lower than a maximum speed upon approaching a position at the end of travel.

15. The steering column module according to claim 11, wherein the motor is coupled to a sensor that delivers a signal that is a function of real motor speed, which signal is transmitted to the controller.

16. The steering column module according to claim 11, wherein the controller controls reduction of movement speed upon approaching the end of travel.

17. The steering column module according to claim 11, wherein the controller controls a mode of reduced-speed movement when it receives particular control instructions.

18. The steering column module according to claim 11, wherein the controller generates motor control/command signals in the form of constant tension scrambled at a variable cyclic ratio.

19. The steering column module according to claim 11, wherein the controller controls the variable speed of the motor by a closed-loop regulation.

20. The steering column module according to claim 11, wherein parts activated by the motor comprise at least one position reference sensor.

* * * * *